United States Patent
Miranda et al.

(10) Patent No.: US 10,337,343 B2
(45) Date of Patent: Jul. 2, 2019

(54) TURBINE COMPONENT SURFACE COOLING SYSTEM WITH PASSIVE FLOW MODULATION

(71) Applicant: General Electric Company, Schenectady, NY (US)

(72) Inventors: Carlos Miguel Miranda, Greer, SC (US); Benjamin Paul Lacy, Greer, SC (US); Slawomir Rubinsztajn, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 692 days.

(21) Appl. No.: 14/825,553

(22) Filed: Aug. 13, 2015

(65) Prior Publication Data
US 2017/0044914 A1    Feb. 16, 2017

(51) Int. Cl.
| F01D 5/18 | (2006.01) |
| F01D 9/06 | (2006.01) |
| F01D 17/08 | (2006.01) |
| F01D 25/12 | (2006.01) |
| F02C 7/12 | (2006.01) |

(52) U.S. Cl.
CPC .............. *F01D 9/065* (2013.01); *F01D 5/186* (2013.01); *F01D 17/085* (2013.01); *F01D 25/12* (2013.01); *F02C 7/12* (2013.01); *F05D 2220/32* (2013.01); *F05D 2240/10* (2013.01); *F05D 2260/205* (2013.01); *F05D 2270/303* (2013.01)

(58) Field of Classification Search
None
See application file for complete search history.

(56) References Cited

U.S. PATENT DOCUMENTS

| 2,906,494 A * | 9/1959 | McCarty ................. F01D 5/18 137/468 |
| 8,434,692 B2 * | 5/2013 | Scott ....................... F23R 3/06 137/467 |
| 9,028,206 B2 | 5/2015 | Liotta et al. |

(Continued)

FOREIGN PATENT DOCUMENTS

| EP | 1 028 230 A1 | 8/2000 |
| GB | 2 354 290 A | 3/2001 |
| GB | 2 457 073 A | 8/2009 |

OTHER PUBLICATIONS

Extended European Search Report and Opinion issued in connection with corresponding EP Application No. 16182030.3 dated Jan. 16, 2017.

*Primary Examiner* — Kayla McCaffrey
(74) *Attorney, Agent, or Firm* — Ernest G. Cusick; Hoffman Warnick LLC (57) ABSTRACT

A system according to various embodiments includes: a cooling network within a turbine component, the cooling network including at least one passageway fluidly connected with a surface of the turbine component; a cooling fluid source for providing a cooling fluid to the cooling network; and a temperature-actuated flow modulating device fluidly connected with the cooling fluid source and the cooling network, the temperature-actuated flow modulating device configured to: detect an ambient air temperature proximate the turbine component; and control a flow of the cooling fluid to the cooling network based upon the detected ambient air temperature.

13 Claims, 5 Drawing Sheets

(56) References Cited

U.S. PATENT DOCUMENTS

| | | | |
|---|---|---|---|
| 2009/0226327 A1* | 9/2009 | Little | F01D 5/082 416/96 A |
| 2011/0162384 A1* | 7/2011 | Langdon, II | F01D 17/085 60/782 |
| 2014/0123659 A1 | 5/2014 | Biyani et al. | |
| 2014/0255145 A1 | 9/2014 | Miranda et al. | |
| 2015/0037140 A1 | 2/2015 | Biyani et al. | |
| 2015/0086408 A1 | 3/2015 | Kottiling et al. | |

* cited by examiner

TURBINE COMPONENT SURFACE COOLING SYSTEM WITH PASSIVE FLOW MODULATION

BACKGROUND OF THE INVENTION

The subject matter disclosed herein relates to turbines. Specifically, the subject matter disclosed herein relates to components in gas turbines.

Gas turbines include static blade assemblies that direct flow of a working fluid (e.g., gas) into turbine buckets connected to a rotating rotor. These buckets are designed to withstand the high-temperature, high-pressure environment within the turbine. Conventional turbine components (e.g., gas turbine buckets, nozzles, etc.), for example, in the hot gas path (HGP), are subject to particularly harsh temperature and pressure conditions. Cooling these components is a challenge in design and operation of gas turbines.

BRIEF DESCRIPTION OF THE INVENTION

Various embodiments of the disclosure include a system having: a cooling network within a turbine component, the cooling network including at least one passageway fluidly connected with a surface of the turbine component; a cooling fluid source for providing a cooling fluid to the cooling network; and a temperature-actuated flow modulating device fluidly connected with the cooling fluid source and the cooling network, the temperature-actuated flow modulating device configured to: detect an ambient air temperature proximate the turbine component; and control a flow of the cooling fluid to the cooling network based upon the detected ambient air temperature.

A first aspect of the disclosure includes a system having: a cooling network within a turbine component, the cooling network including at least one passageway fluidly connected with a surface of the turbine component; a cooling fluid source for providing a cooling fluid to the cooling network; and a temperature-actuated flow modulating device fluidly connected with the cooling fluid source and the cooling network, the temperature-actuated flow modulating device configured to: detect an ambient air temperature proximate the turbine component; and control a flow of the cooling fluid to the cooling network based upon the detected ambient air temperature.

A second aspect of the disclosure includes a turbine component having: a body having an outer surface; a cooling network within the outer surface, the cooling network including at least one passageway fluidly connected with the outer surface; a cooling fluid source for providing a cooling fluid to the cooling network; and a temperature-actuated flow modulating device fluidly connected with the cooling fluid source and the cooling network, the temperature-actuated flow modulating device configured to: detect at least one of an ambient air temperature proximate the outer surface or a temperature of the outer surface of the body; and control a flow of the cooling fluid to the cooling network based upon the detected at least one of the ambient air temperature or the temperature of the outer surface of the body.

A third aspect of the disclosure includes a turbine having: a stator; and a rotor contained within the stator, the rotor having: a spindle; and a plurality of buckets extending radially from the spindle, at least one of the plurality of buckets having: a body including an outer surface; a cooling network within the outer surface, the cooling network including at least one passageway fluidly connected with the outer surface; a cooling fluid source for providing a cooling fluid to the cooling network; and a temperature-actuated flow modulating device fluidly connected with the cooling fluid source and the cooling network, the temperature-actuated flow modulating device configured to: detect an ambient air temperature proximate the outer surface; and control a flow of the cooling fluid to the cooling network based upon the detected ambient air temperature.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As noted herein, the subject matter disclosed relates to turbines. Specifically, the subject matter disclosed herein relates to cooling components in gas turbines.

In contrast to conventional approaches, various embodiments of the disclosure include systems for cooling one or more turbine component(s), each system including a temperature-actuated flow modulating device for controlling flow of a cooling fluid to a cooling network within the component(s). In various embodiments, the temperature-actuated flow modulating device is mounted or otherwise attached to the turbine component, e.g., a hot gas path (HGP) component in a turbine such as a gas turbine (e.g., turbine blades, turbine shrouds, turbine nozzles, etc.) and/or non-HGP components in a gas turbine (e.g., other components in gas turbine combustion system external to the HGP). Various systems include a ballast-based flow-modulating valve, coupled with a temperature detecting device (e.g., a thermocouple), to control cooling fluid flow based upon a detected ambient temperature condition proximate the component(s).

Various aspects of the disclosure can improve upon conventional cooling approaches, e.g., by adding a passive flow modulation capability to a gas turbine component surface cooling circuit. These improvements can include at least: a) improved performance due to reduced component cooling flow consumption over the turbine's operating range; and b) improved back flow margin, due to the ability to vary the total effective area of the component internal cooling flow network and increase component internal pressure relative to hot gas flow path pressure.

As denoted in these Figures, the "A" axis represents axial orientation (along the axis of the turbine rotor, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. It is further understood that common numbering between FIGURES can denote substantially identical components in the FIGURES.

Figure 1:
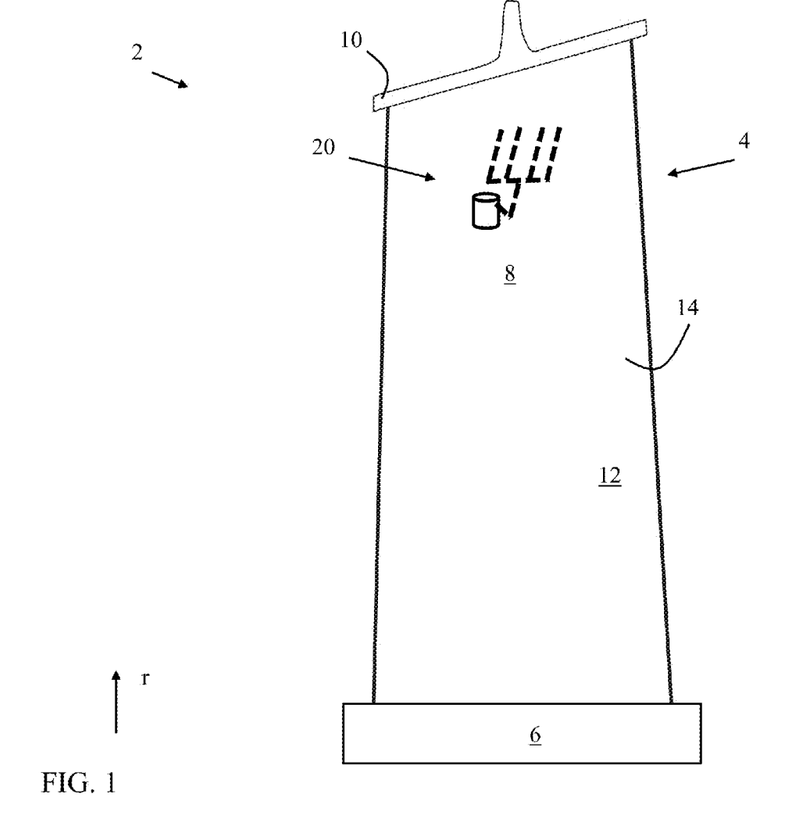
FIG. 1 shows a side schematic view of a turbine component according to various embodiments.

Turning to FIG. 1, a side schematic view of a turbine component 2 (e.g., a gas turbine blade) is shown according to various embodiments. As shown, turbine component 2 can include a base 6, a blade 8 coupled to base 6 (and extending radially outward from base 6, and a shroud 10 coupled to the blade 8 radially outboard of blade 8. As is known in the art, base 6, blade 8 and shroud 10 may each be formed of one or more metals (e.g., steel, alloys of steel, etc.) and can be formed (e.g., cast, forged or otherwise machined) according to conventional approaches. Base 6, blade 8 and shroud 10 may be integrally formed (e.g., cast, forged, three-dimensionally printed, etc.), or may be formed as separate components which are subsequently joined (e.g., via welding, brazing, bonding or other coupling mechanism).

Figure 2:
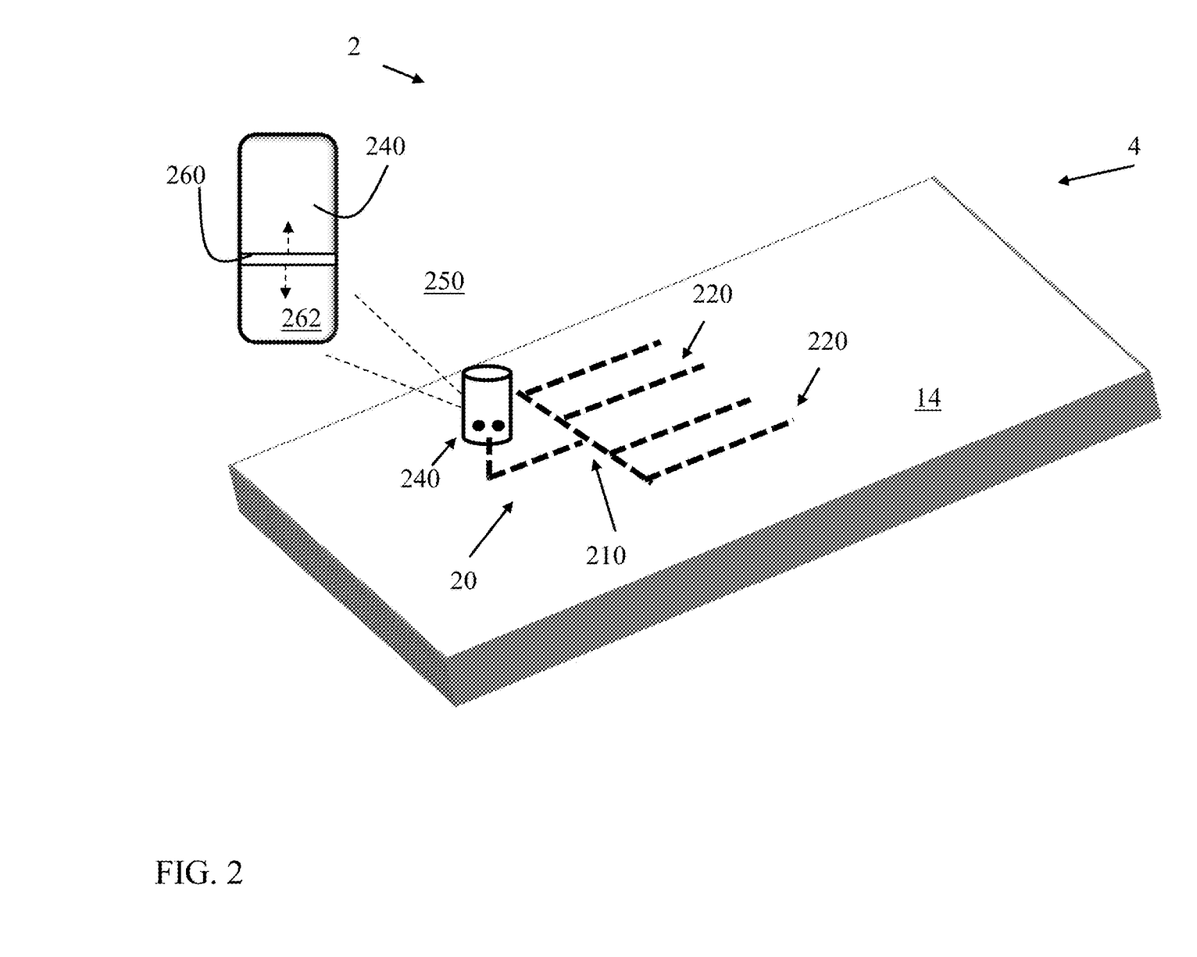
FIG. 2 shows a close-up three-dimensional perspective view of a portion of the component of FIG. 1 along with a system according to various embodiments.
Figure 3:
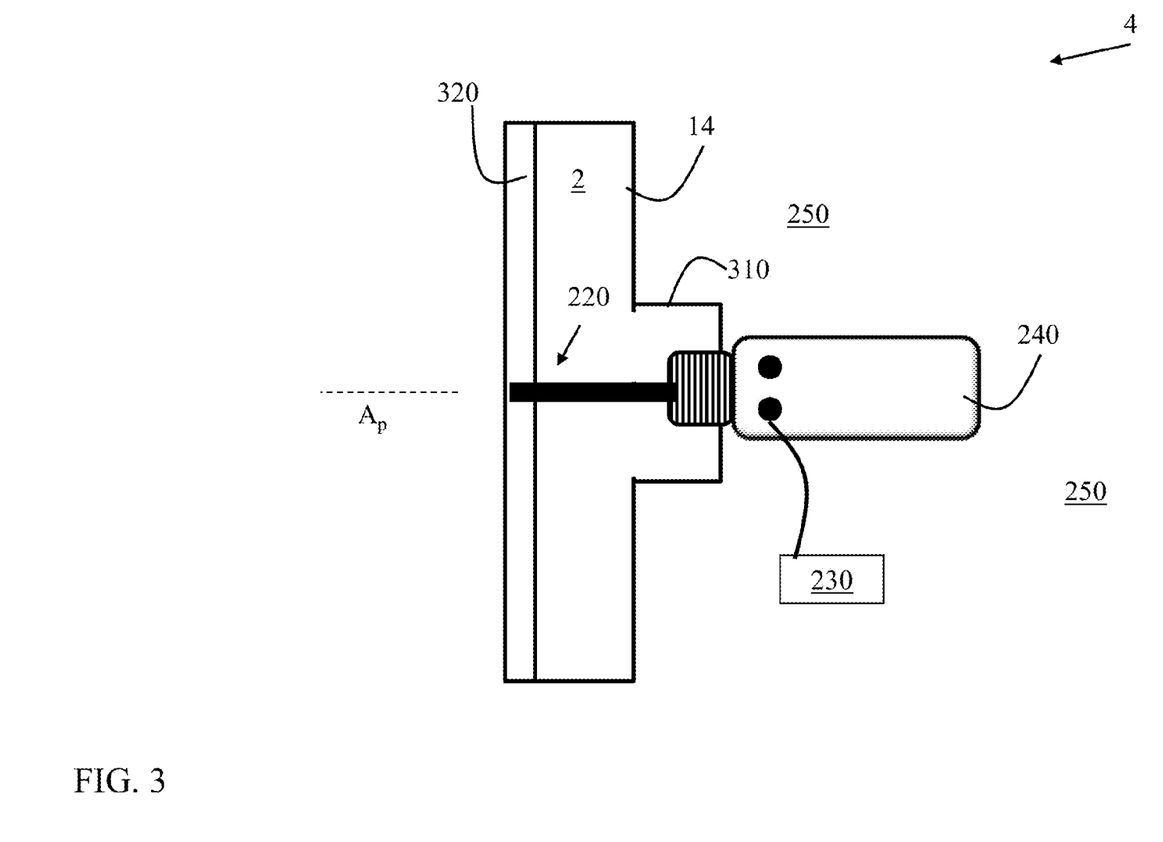
FIG. 3 shows a partial cross-sectional side view of the system of FIG. 2.

In particular, FIG. 1 shows blade 8 which includes a body 12, e.g., an outer casing or shell, having an outer surface 14. FIG. 2 shows a close-up three-dimensional perspective view of a portion 4 of component 2, with further illustration of outer surface 14. In various embodiments, surface 14 includes a "cold" surface or "cold" side of component 2, such that this side of component is subject to lower temperatures than other sides of component, e.g., an opposing side directly impacted by hot gas. Also shown in FIGS. 1-2 is a temperature control system (system) 20, coupled with outer surface 14 of component 2. FIG. 3 shows a partial cross-sectional side view of portion 4 of component 2, including system 20. Reference is made to FIGS. 1-3 simultaneously, and it is understood that identical numbering throughout the figures can represent substantially identical components.

Turning particularly to FIGS. 2-3, system 20 is shown including a cooling network 210 within turbine component 2. Cooling network 210 can include at least one passageway 220 (several shown) fluidly connected with surface (outer surface) 14 of turbine component 2. That is, passageway(s) 220 are present either within surface 14 (e.g., as trenches), or in some cases, extend from the surface 14 into the body 12 (and in some cases back to surface 14), to allow for a flow of cooling fluid through component 2. Cooling fluid can include, for example, air. Cooling fluid can be provided from a cooling fluid source 230, which may include a distinct portion of a machine (e.g., gas turbine) containing component 2. For example, in the case of a gas turbomachine (e.g., gas turbine), the cooling fluid source 230 can include discharge air from the turbine compressor. In various additional embodiments, cooling fluid source 230 can include an external source of pressurized air, such as a dedicated compressor, mixed with hot air extracted from the turbine compressor. It is understood that according to embodiments, the cooling fluid (e.g., air) is at a higher pressure than the pressure of the gas flow path (working fluid), e.g., in order to meet back flow margin requirements.

System 20 can further include a temperature-actuated flow modulating device (flow modulating device) 240, fluidly connected with the cooling fluid source 230 and the cooling network 210. As described further herein, flow modulating device 240 can be configured (e.g., sized and calibrated) to: a) detect an ambient air (250) temperature proximate turbine component 2; and b) control a flow of cooling fluid (from cooling fluid source 230) to cooling network 210 based upon the detected temperature of ambient air 250.

In various particular embodiments, flow modulating device 240 can include a valve 260 sized to permit a fixed amount of flow of cooling fluid (from cooling fluid source 230) to cooling network 210 based upon a baseline temperature condition. For example, baseline temperature condition can include a range of temperatures associated with a specific amount of cooling flow, e.g., a temperature range between approximately 260 degrees Celsius (C) (~500 F.) and approximately 490 degrees C (~900 F), associated with a given flow rate of cooling fluid. Valve 260 can include a ballast fluid 262 configured to control a position of a valve 260, as described herein. Flow modulating device 240 can be formed of a temperature-sensitive material, such as molten salts or other fluid materials with a thermal stability limit exceeding design condition, which can be calibrated in terms of mass and volume to allow for expansion and contraction based upon an ambient temperature (temperature of air or material contacting flow modulating device 240). Expansion of the temperature-sensitive material allows the valve 260 to move by forcing a compressible structural element, such as a bellows, to displace, forcing the valve (disc) 260 to move, thereby permitting a modified amount of flow of cooling fluid through flow modulating device 240. In various embodiments, flow modulating device 240 permits a modified (modulated) amount of flow of cooling fluid (from cooling fluid source 230) to cooling network 210 in response to detecting that the temperature of the ambient air 250 (and/or detected temperature of outer surface 14 of component 2, in embodiments where flow modulating device 240 contacts component 2) exceeds the baseline temperature condition, e.g., falls outside of the temperature range. In particular, when the temperature of the ambient air 250 and/or outer surface 14 exceeds the baseline temperature condition (e.g., falls outside of range), the ballast fluid 262 expands and modifies a position of valve 260, to permit a modified amount of flow of cooling fluid to cooling network 210. In some cases, when ballast fluid 262 is heated (e.g., temperature of ambient air 250 and/or outer surface 14 exceeds baseline temperature condition), a greater amount of cooling fluid flow (from cooling fluid source 230) is permitted to cooling network 210; and subsequently, when the temperature of ambient air 250 and/or outer surface 14 decreases, ballast fluid 262 cools and contracts, modifying the position of valve 260 back toward its baseline, closed position (allowing corresponding baseline flow). This baseline temperature condition can be correlated, for example, with a given turbine operating condition, for example, International Organization of Standards (ISO) daytime conditions for the particular region where the turbine is operating. The actuation point of the flow modulating device 240 can be tied to the engine operating condition at which additional, modulated cooling flow is desired to prevent component temperatures from exceeding their design limit.

In various embodiments, as described herein flow modulating device 240 is mounted to surface 14 of turbine component 2. That is, flow modulating device 240 can be adhered, welded, brazed, bonded, screwed or otherwise mounted to surface 14 of turbine component 2. In some cases, for example, as shown in FIG. 3, a material build-up 310 is formed on surface 14, e.g., as a cast feature or a build-up of metal such as a weld or braze build-up, and flow modulating device is mounted (as described herein) to the material build-up 310. FIG. 3 shows one configuration in which flow-modulating device 240 is mounted in a direction such that its primary axis $A_p$ is aligned perpendicularly with surface 14 of turbine component 2 (shown mounted on a build-up 310). In some cases, flow modulating device 240 has a width of approximately 3 millimeters (mm) (approximately ⅛ inch) to approximately 25 mm (one inch), measured across the primary axis ($A_p$) of the flow modulating device 240. It is understood, however, that these dimensions are merely examples, and that the dimensions of flow modulating device 240 may be scaled depending upon the cooling flow demand for a particular turbine component. In various embodiments, system 20 further includes a top coat 320 (FIG. 3), which can be applied to an opposite surface 314 of component 2 from surface 14, such that top coat form a cooling flow path surface in component 2, thereby enhancing the cooling effect of the cooling network 210 on component 2.

Figure 4:
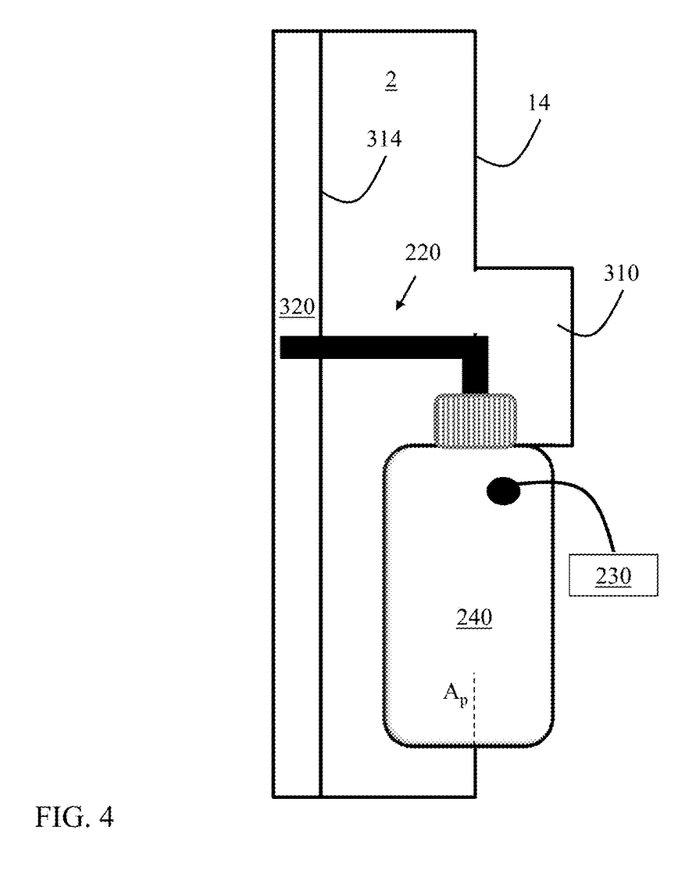
FIG. 4 shows a partial cross-sectional side view of a system according to various additional embodiments.

In various additional embodiments, as shown in FIG. 4, flow modulating device 240 is aligned parallel with surface 14 of the turbine component 2, and can, in this example, be mounted to a material build-up 310. In this configuration—(FIG. 2), the portion of flow modulating device 240 which contains the ballast fluid 262 is in full or partial contact with surface 14 (instead of ambient air 250 in FIGS. 2-3), and as such, in these embodiments, flow modulating device 240 is configured to: a) detect a temperature of surface 14 of component 2; and b) control a flow of cooling fluid (from cooling fluid source 230) to cooling network 210 based upon the detected temperature of surface 14. This control function can be substantially similar to the control function described with respect to contacting ambient air 250, except that the temperature of the surface 14 acts as the control input in the alternative embodiment of FIG. 4.

Figure 5:
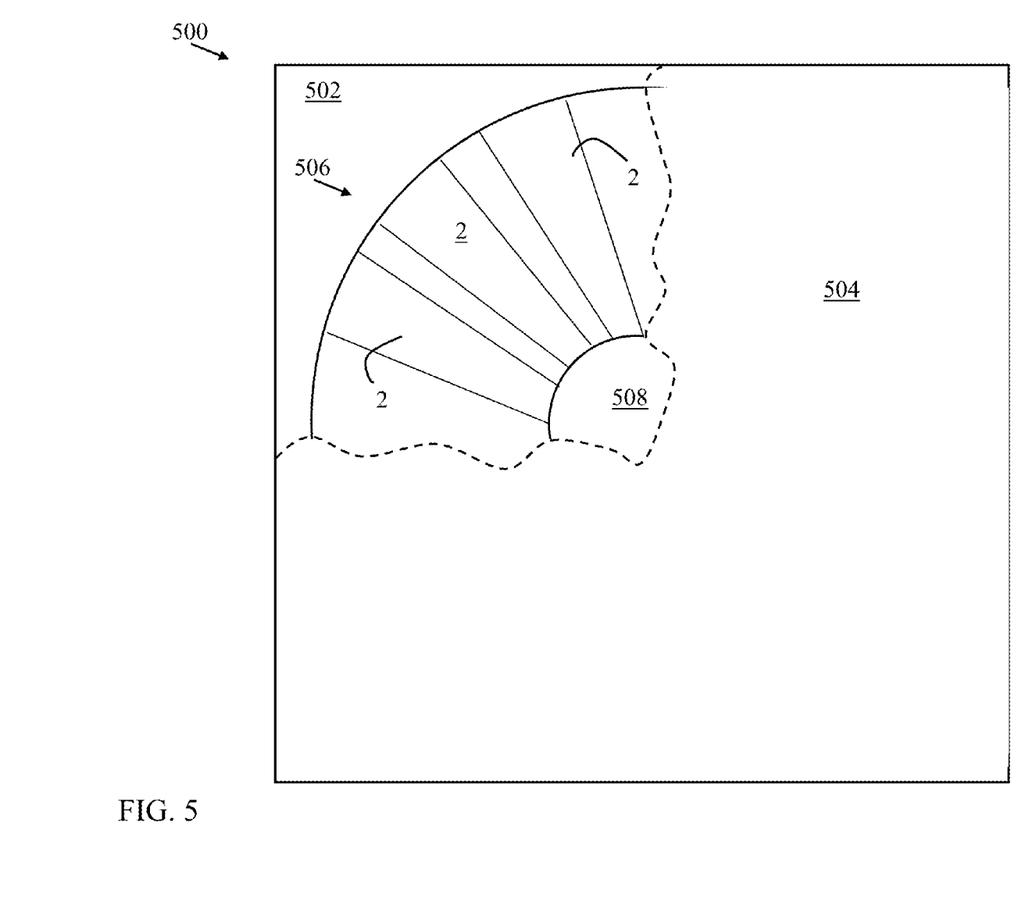
FIG. 5 shows a schematic partial cross-sectional depiction of a turbine according to various embodiments.

FIG. 5 shows a schematic partial cross-sectional depiction of a turbine 500, e.g., a gas turbine, according to various embodiments. Turbine 500 includes a stator 502 (shown within casing 504) and a rotor 506 within stator 502, as is known in the art. Rotor 506 can include a spindle 508, along with a plurality of components 2 (e.g., turbine buckets) extending radially from spindle 508. In some cases, components 2 (e.g., turbine buckets) can be located in a mid-stage within turbine 500. That is, where turbine 500 includes four (4) stages (axially dispersed along spindle 508, as is known in the art), components 2 (e.g., turbine buckets) can be located in a second stage (stage 2) within turbine 500, or, where turbine 500 includes five (5) stages (axially dispersed along spindle 508), components 2 (e.g., turbine buckets) can be located in a third stage (stage 3) within turbine 500.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a cooling network within a turbine component, the cooling network including at least one passageway fluidly connected with a surface of the turbine component;
   a cooling fluid source for providing a cooling fluid to the cooling network; and
   a temperature-actuated flow modulating device mounted to the surface of the turbine component and fluidly connected with the cooling fluid source and the cooling network, the temperature-actuated flow modulating device configured to:
   detect a temperature of an ambient air temperature proximate the turbine component; and
   control a flow of the cooling fluid to the cooling network based upon the detected ambient air temperature,
   wherein the temperature-actuated flow modulating device includes a valve sized to permit a fixed amount of flow of the cooling fluid based upon a baseline temperature condition, wherein the temperature-actuated flow modulating device is configured to permit a modified amount of flow of the cooling fluid to the cooling network in response to detecting the temperature of the ambient air exceeds the baseline temperature condition, and
   wherein the temperature-actuated flow modulating device includes a ballast fluid configured to control a position of the valve, and responds to the ambient air temperature exceeding the baseline temperature condition by expanding the ballast fluid and modifying a position of the valve to permit the modified amount of flow of the cooling fluid to the cooling network.

2. The system of claim 1, wherein the baseline temperature condition includes a range of temperatures.

3. The system of claim 1, wherein a primary axis of the temperature-actuated flow modulating device is aligned perpendicularly with the surface of the turbine component.

4. The system of claim 1, further comprising a material build-up on the surface of the turbine component, wherein the temperature-actuated flow modulating device is mounted to the material build-up.

5. The system of claim 4, wherein a primary axis of the temperature-actuated flow modulating device is aligned parallel with the surface of the turbine component.

6. The system of claim 1, wherein the temperature-actuated flow modulating device has a width of approximately 3 millimeters (mm) to approximately 25 mm measured across a primary axis of the temperature-actuated flow modulating device.

7. The system of claim 1, wherein the surface of the turbine component is an outer surface.

8. A turbine component comprising:
a body having an outer surface;
a cooling network within the outer surface, the cooling network including at least one passageway fluidly connected with the outer surface;
a cooling fluid source for providing a cooling fluid to the cooling network; and
a temperature-actuated flow modulating device mounted to the outer surface of the turbine component and fluidly connected with the cooling fluid source and the cooling network, the temperature-actuated flow modulating device configured to:
  detect at least one of an ambient air temperature proximate the outer surface or a temperature of the outer surface of the body; and
  control a flow of the cooling fluid to the cooling network based upon the detected at least one of the ambient air temperature or the temperature of the outer surface,
wherein the temperature-actuated flow modulating device includes a valve sized to permit a fixed amount of flow of the cooling fluid based upon a baseline temperature condition, wherein the temperature-actuated flow modulating device is configured to permit a modified amount of flow of the cooling fluid to the cooling network in response to detecting the temperature of the ambient air exceeds the baseline temperature condition, and
wherein the temperature-actuated flow modulating device includes a ballast fluid configured to control a position of the valve, and responds to the ambient air temperature exceeding the baseline temperature condition by expanding the ballast fluid and modifying a position of the valve to permit the modified amount of flow of the cooling fluid to the cooling network.

9. The turbine component of claim 8, wherein the baseline temperature condition includes a range of temperatures.

10. The turbine component of claim 8, wherein a primary axis of the temperature-actuated flow modulating device is aligned perpendicularly with the outer surface of the turbine component.

11. The turbine component of claim 8, further comprising a material build-up on the outer surface of the turbine component, wherein the temperature-actuated flow modulating device is mounted to the material build-up, and a primary axis of the temperature-actuated flow modulating device is aligned parallel with the outer surface of the turbine component.

12. The turbine component of claim 8, wherein the temperature-actuated flow modulating device has a width of approximately 3 millimeters (mm) to approximately 25 mm measured across a primary axis of the temperature-actuated flow modulating device.

13. A turbine comprising:
a stator; and
a rotor contained within the stator, the rotor having:
  a spindle; and
  a plurality of buckets extending radially from the spindle, at least one of the plurality of buckets having:
    a body including an outer surface;
    a cooling network within the outer surface, the cooling network including at least one passageway fluidly connected with the outer surface;
    a cooling fluid source for providing a cooling fluid to the cooling network; and
    a temperature-actuated flow modulating device mounted to the outer surface of the turbine component and fluidly connected with the cooling fluid source and the cooling network, the temperature-actuated flow modulating device configured to:
      detect an ambient air temperature proximate the outer surface; and
      control a flow of the cooling fluid to the cooling network based upon the detected ambient air temperature,
    wherein the temperature-actuated flow modulating device includes a valve sized to permit a fixed amount of flow of the cooling fluid based upon a baseline temperature condition, wherein the temperature-actuated flow modulating device is configured to permit a modified amount of flow of the cooling fluid to the cooling network in response to detecting the temperature of the ambient air exceeds the baseline temperature condition, and
    wherein the temperature-actuated flow modulating device includes a ballast fluid configured to control a position of the valve, and responds to the ambient air temperature exceeding the baseline temperature condition by expanding the ballast fluid and modifying a position of the valve to permit the modified amount of flow of the cooling fluid to the cooling network.

* * * * *